(12) United States Patent
Yoshida et al.

(10) Patent No.: US 9,587,744 B2
(45) Date of Patent: Mar. 7, 2017

(54) SEALING MATERIAL (71) Applicant: NIPPON VALQUA INDUSTRIES, LTD., Tokyo (JP)

(72) Inventors: Nobuhiro Yoshida, Gojo (JP); Masamichi Iwaki, Gojo (JP)

(73) Assignee: NIPPON VALQUA INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/032,795

(22) PCT Filed: Oct. 7, 2014

(86) PCT No.: PCT/JP2014/076764
§ 371 (c)(1),
(2) Date: Apr. 28, 2016

(87) PCT Pub. No.: WO2015/064314
PCT Pub. Date: May 7, 2015

(65) Prior Publication Data
US 2016/0258533 A1    Sep. 8, 2016

(30) Foreign Application Priority Data
Oct. 29, 2013   (JP) ................................. 2013-224215

(51) Int. Cl.
*F16J 15/06* (2006.01)
*F16J 15/02* (2006.01)

(52) U.S. Cl.
CPC ........... *F16J 15/025* (2013.01); *F16J 15/062* (2013.01)

(58) Field of Classification Search
CPC   F16J 15/02; F16J 15/021; F16J 15/022; F16J 15/025; F16J 15/06; F16J 15/062
See application file for complete search history.

(56) References Cited

U.S. PATENT DOCUMENTS 4,690,414 A * 9/1987 Haaland ................ B28B 21/563
                                                        277/604
6,322,087 B1 * 11/2001 Swensen .............. F16J 15/0887
                                                        277/608
(Continued)

FOREIGN PATENT DOCUMENTS

EP        1640643 A1     3/2006
JP     2000-283296 A    10/2000
(Continued)

OTHER PUBLICATIONS

International Search Report dated Jan. 6, 2015 that issued in PCT Patent Application No. PCT/JP2014/076764.

*Primary Examiner* — Gilbert Lee
(74) *Attorney, Agent, or Firm* — Dickinson Wright PLLC (57) ABSTRACT

The sealing material is configured to be installed in a dovetail groove. The sealing material has a seal cross-section including a main body arranged on a bottom surface of the dovetail groove, and a lip portion which is bent from an end of the main body and extends toward an outside of the dovetail groove. The seal cross-section has such a V shape that each of the main body and the lip portion extends linearly from a bending position between the main body and the lip portion. A width B1 of the main body in a direction orthogonal to a direction in which the main body extends linearly is not more than a width B2 of the lip portion in a direction orthogonal to a direction in which the lip portion extends linearly. This configuration provides the sealing material which can be used under an extremely low load.

7 Claims, 7 Drawing Sheets

(56) References Cited

U.S. PATENT DOCUMENTS

| | | | |
|---|---|---|---|
| 6,523,833 B1* | 2/2003 | Ishigaki | F16J 15/062 |
| | | | 277/549 |
| 7,306,237 B2* | 12/2007 | Tsuji | F16J 15/106 |
| | | | 277/644 |
| 2010/0117309 A1 | 5/2010 | Yudovsky | |
| 2011/0018211 A1* | 1/2011 | Tsuji | F16J 15/064 |
| | | | 277/628 |

FOREIGN PATENT DOCUMENTS

| | | |
|---|---|---|
| JP | 2006-090463 A | 4/2006 |
| JP | 2006220229 A | 8/2006 |
| JP | 2010-054013 A | 3/2010 |
| WO | WO 2009/113417 A1 | 9/2009 |

* cited by examiner

SEALING MATERIAL

TECHNICAL FIELD

The present invention generally relates to a sealing material, and more specifically relates to a sealing material configured to be installed in a dovetail groove.

BACKGROUND ART

Regarding conventional sealing materials, Japanese Patent Laying-Open No. 2006-220229 (PTD 1) for example discloses a sealing material for a dovetail groove. This sealing material is excellent in ease of installation in the dovetail groove, has a high resistance to dropping, can produce a sufficient sealing strength under a low load even when the size is increased, and aims to prevent generation of particles due to metal touch.

The sealing material for a dovetail groove disclosed in PTD 1 is a sealing material in a closed annular shape, and the sealing material is installed at a location where one member in which a dovetail groove in a closed annular shape is formed and the other member are to be sealed together. The sealing material includes, as its constituent parts, a sealing material main body installed in the dovetail groove and an obliquely extending lip portion provided on an exterior surface of the sealing material main body extending outward from the dovetail grove.

CITATION LIST

Patent Document

PTD 1: Japanese Patent Laying-Open No. 2006-220229

SUMMARY OF INVENTION

Technical Problem

As disclosed in above-referenced PTD 1, the sealing material installed in a trapezoidal dovetail groove is known. The sealing material for a dovetail groove disclosed in PTD 1 is configured to include the sealing material main body having a volume sufficient to ensure stability after the sealing material is installed in the dovetail groove, and the lip portion deformable under a low load when the sealing material is brought into contact with the other member.

The environment in which the sealing material is used has significantly expanded and the need has also arisen for use of the sealing material under an extremely low load (clamping load) which has not heretofore been assumed. However, as to the above-described conventional sealing material, when the amount of deformation of the lip portion exceeds a certain value, a compressive stress generated in the sealing material starts affecting even the main body having a high stiffness. At this time, a reactive force applied from the sealing material to the other member sharply increases, and it therefore becomes difficult to meet a condition for use under an extremely low load.

In view of the above, an object of the present invention is to solve the above-described problem and provide a sealing material which can be used under an extremely low load.

Solution to Problem

A sealing material according to an aspect of the present invention is a sealing material configured to be installed in a dovetail groove and having a closed annular shape. The sealing material has a seal cross-section including a main body arranged on a bottom surface of the dovetail groove, and a lip portion bent from an end of the main body and extending toward an outside of the dovetail groove. The seal cross-section has such a V shape that each of the main body and the lip portion extends linearly from a bending position between the main body and the lip portion. A width of the main body in a direction orthogonal to a direction in which the main body extends linearly is not more than a width of the lip portion in a direction orthogonal to a direction in which the lip portion extends linearly.

As to the sealing material configured in this manner, deformation of the main body is also promoted in addition to deformation of the lip portion to thereby keep small a compressive reaction force generated in the sealing material. Accordingly, the sealing material which can be used under an extremely low load can be implemented.

Preferably, the width of the main body is equal to the width of the lip portion. As to the sealing material configured in this manner, the sealing material which can be used under an extremely low load can be implemented.

Preferably, a length of the main body in the direction in which the main body extends linearly is equal to a length of the lip portion in the direction in which the lip portion extends linearly. Preferably, a length of the main body in the direction in which the main body extends linearly is larger than a length of the lip portion in the direction in which the lip portion extends linearly. Preferably, a length of the main body in the direction in which the main body extends linearly is smaller than a length of the lip portion in the direction in which the lip portion extends linearly.

As to the sealing material configured in this manner, the sealing material which can be used under an extremely low load can be implemented.

Preferably, the sealing material in a closed annular shape has an elongation percentage $(((Rb-Ra)/Ra)\times100)$ of not less than 0% and not more than 4%, where Ra is an inner diameter of the sealing material in the closed annular shape and Rb is an inner diameter of the dovetail groove in a closed annular shape.

As to the sealing material configured in this manner, the sealing material can be provided along the inner circumference of the dovetail groove, with a cross-section deformation of the sealing material suppressed. Accordingly, the ease of installation of the sealing material in the dovetail groove as well as the stability of the sealing material after installed can be improved.

Preferably, the main body has a first surface abutting on the bottom surface of the dovetail groove. The lip portion has a second surface abutting on a side surface of the dovetail groove. A seal angle $\beta$ formed by the first surface and the second surface satisfies a relation $0.7\alpha \leq \beta \leq 1.3\alpha$, where $\alpha$ is a groove angle formed by the bottom surface and the side surface of the dovetail groove.

As to the sealing material configured in this manner, the sealing material can be provided along the inner circumference of the dovetail groove. Accordingly, the stability of the sealing material after installed in the dovetail groove can be improved.

A sealing material according to another aspect of the present invention is a sealing material configured to be installed in a dovetail groove and having a closed annular shape. The sealing material has a seal cross-section including a main body arranged on a bottom surface of the dovetail groove, and a lip portion bent from an end of the main body and extending toward an outside of the dovetail groove. The seal cross-section has a cross-section characteristic that a stiffness of the main body is not more than a stiffness of the lip portion.

As to the sealing material configured in this manner, deformation of the main body is also promoted in addition to deformation of the lip portion to thereby keep small a compressive reaction force generated in the sealing material. Accordingly, the sealing material which can be used under an extremely low load can be implemented.

Advantageous Effects of Invention

As described above, according to the present invention, a sealing material which can be used under an extremely low load can be provided.

DESCRIPTION OF EMBODIMENTS

Embodiments of the present invention will be described with reference to the drawings. In the drawings referenced below, the same or corresponding members are denoted by the same numerals.

First Embodiment

Figure 1:
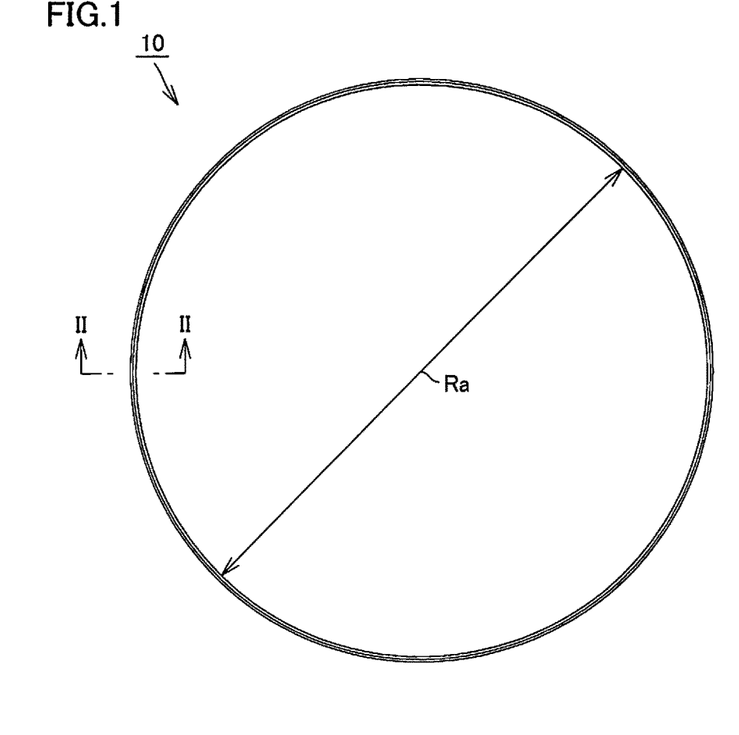
FIG. 1 is a plan view showing a sealing material in a first embodiment of the present invention.
Figure 2:
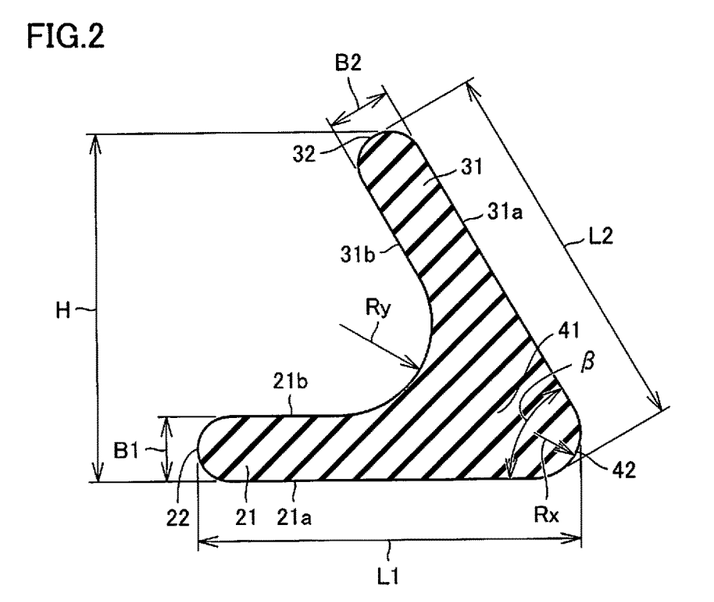
FIG. 2 is a cross-sectional view showing the sealing material along a line II-II in FIG. 1.
Figure 3:
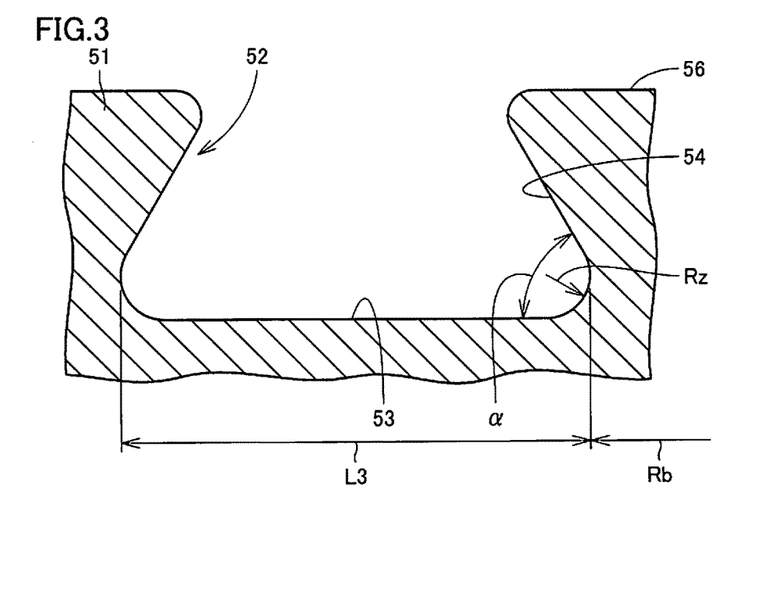
FIG. 3 is a cross-sectional view showing a dovetail groove.
Figure 4:
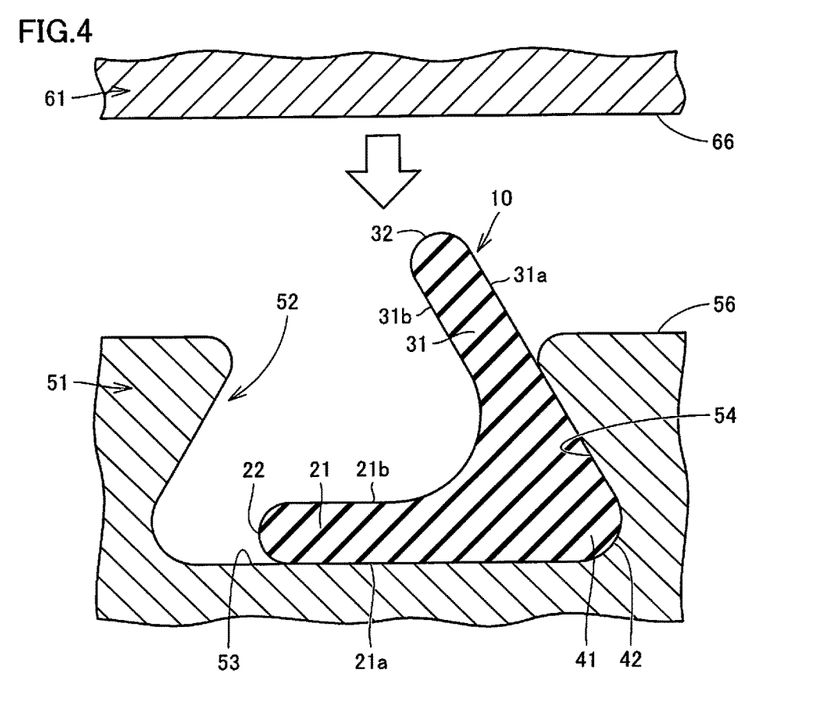
FIG. 4 is a cross-sectional view showing a state in which the sealing material in FIG. 2 is installed in the dovetail groove.

FIG. 1 is a plan view showing a sealing material in a first embodiment of the present invention. FIG. 2 is a cross-sectional view showing the sealing material along a line II-II in FIG. 1. FIG. 3 is a cross-sectional view showing a dovetail groove. FIG. 4 is a cross-sectional view showing a state in which the sealing material in FIG. 2 is installed in the dovetail groove.

Referring to FIGS. 1 to 4, a description will be given first of a basic structure of a sealing material 10 in the first embodiment. Sealing material 10 in the present embodiment is a sealing material configured to be installed in a dovetail groove 52 and having a closed annular shape. Sealing material 10 has a seal cross-section including a main body 21 arranged on a bottom surface 53 of dovetail groove 52, and a lip portion 31 which is bent from an end of main body 21 and extends toward an outside of dovetail groove 52. The seal cross-section has such a V shape that each of main body 21 and lip portion 31 extends linearly from a bending position 41 between main body 21 and lip portion 31. A width B1 of main body 21 in a direction orthogonal to a direction in which main body 21 extends linearly is not more than a width B2 of lip portion 31 in a direction orthogonal to a direction in which lip portion 31 extends linearly.

Next, a more specific description will be given of the structure of sealing material 10. Sealing material 10 is a sealing material in a closed annular shape, and used for sealing between a first member 51 and a second member 61. Sealing material 10 is formed of an elastic member such as rubber. The rubber material used for sealing material 10 may for example be fluororubber, silicone rubber, EPDM-based rubber, or the like having a hardness of approximately 60 to 70 HA.

First member 51 has a mating surface 56 and second member 61 has a mating surface 66. First member 51 and second member 61 are arranged so that mating surface 56 and mating surface 66 face each other.

In first member 51, dovetail groove 52 in a closed annular shape is formed. Sealing material 10 is installed in dovetail groove 52. Dovetail groove 52 has a shape of a groove having an opening in mating surface 56 of first member 51. In a cross section of first member 51 cut along a plane orthogonal to the direction of a tangent to groove 52 extending in the closed annular shape, dovetail groove 52 has a trapezoidal cross-sectional shape.

Dovetail groove 52 has bottom surface 53 and a side surface 54. Bottom surface 53 extends in parallel with mating surface 56 of first member 51. Side surface 54 is tapered from bottom surface 53 toward a plane of the opening of dovetail groove 52 in mating surface 56 of first member 51. Bottom surface 53 and side surface 54 curve and continue to side surface 54 and bottom surface 53, respectively.

While the above description is of dovetail groove 52 having side surface 54 along the inner circumference and side surface 54 along the outer circumference that are both tapered, the dovetail groove is not limited to this. Namely, sealing material 10 may be installed in a dovetail groove in which only its side surface 54 along the inner circumference is tapered.

In the case where sealing material 10 extending in a closed annular shape is cut along a plane orthogonal to the direction of a tangent to sealing material 10, sealing material 10 has a seal cross-section including main body 21 and lip portion 31.

Main body 21 is arranged on bottom surface 53 of dovetail groove 52. Lip portion 31 is bent from an end of main body 21 and extends toward an outside of dovetail groove 52. The seal cross-section of sealing material 10 has such a V shape that main body 21 extends linearly from bending position 41 between main body 21 and lip portion 31 and lip portion 31 extends linearly from bending position 41 between main body 21 and lip portion 31. Main body 21 and lip portion 31 meet at an angle smaller than 90°.

Main body 21 has a leading end 22. Leading end 22 is located at the leading end to which main body 21 extends linearly from bending position 41 between main body 21 and lip portion 31. Leading end 22 is located directly above bottom surface 53 of dovetail groove 52. Lip portion 31 has a leading end 32. Lip portion 31 is located at the leading end to which lip portion 31 extends linearly from bending position 41 between main body 21 and lip portion 31. Leading end 32 is located outside dovetail groove 52.

Main body 21 extends in the direction parallel with bottom surface 53 of dovetail groove 52, from bending position 41 between main body 21 and lip portion 31 to leading end 22. Lip portion 31 extends in the direction parallel with side surface 54 of dovetail groove 52, from bending position 41 between main body 21 and lip portion 31 to leading end 32.

Main body 21 has a front surface 21a and a back surface 21b. Front surface 21a abuts on bottom surface 53 of dovetail groove 52. Back surface 21b is located on the back side with respect to front surface 21a. Front surface 21a and back surface 21b extend in parallel with each other. Lip portion 31 has a front surface 31a and a back surface 31b. Front surface 31a abuts on side surface 54 of dovetail groove 52. Back surface 31b is located on the back side with respect to front surface 31a. Front surface 31a and back surface 31b extend in parallel with each other.

Width B1 of main body 21 in the direction orthogonal to the direction in which main body 21 extends linearly is equal to or less than width B2 of lip portion 31 in the direction orthogonal to the direction in which lip portion 31 extends linearly (B1 B2). Width B1 of main body 21 is the distance between front surface 21a and back surface 21b, and width B2 of lip portion 31 is the distance between front surface 31a and back surface 31b of lip portion 31. In the present embodiment, width B1 of main body 21 is equal to width B2 of lip portion 31.

The cross-sectional area of main body 21 is equal to or less than the cross-sectional area of lip portion 31. In the present embodiment, the cross-sectional area of main body 21 is equal to the cross-sectional area of lip portion 31.

In the present embodiment, a length L1 of main body 21 in the direction in which main body 21 extends linearly is equal to a length L2 of lip portion 31 in the direction in which lip portion 31 extends linearly (L1=L2). Sealing material 10 has a seal cross-section in the shape of an isosceles triangle having its sides connecting a leading end 42 at bending position 41, leading end 22 of main body 21, and leading end 32 of lip portion 31.

The shape of leading end 22 and leading end 32 is not particularly limited. However, in the present embodiment, front surface 21a and back surface 21b curve at leading end 22 and continue to back surface 21b and front surface 21a, respectively, and front surface 31a and back surface 31b curve at leading end 32 and continue to back surface 31b and front surface 31a, respectively.

Leading end 32 of lip portion 31 is formed in a curved shape. Therefore, lip portion 31 can be elastically deformed more smoothly when sealing material 10 is pressed by second member 61. Further, leading end 22 of main body 21 is formed in a curved shape. Therefore, even if sealing material 10 is installed in dovetail groove 52 with main body 21 and lip portion 31 inverted, main body 21 can be elastically deformed more smoothly when sealing material 10 is pressed by second member 61.

Preferably, the radius of curvature (seal top R) of leading end 32 is larger than zero and equal to or less than width B2 of lip portion 31. Preferably, the radius of curvature of leading end 22 is larger than zero and equal to or less than width B1 of main body 21.

Front surface 21a and front surface 31a curve at bending position 41 and continue to front surface 31a and front surface 21a, respectively. Back surface 21b and back surface 31b curve at bending position 41 and continue to back surface 31b and back surface 21b, respectively. In the present embodiment, a radius of curvature Rx at the position where front surface 21a and front surface 31a continue to each other is smaller than a radius of curvature Ry at the position where back surface 21b and back surface 31b continue to each other.

Preferably, radius of curvature Rx at the position where front surface 21a and front surface 31a of sealing material 10 continue to each other is equal to or larger than a radius of curvature Rz at the position where bottom surface 53 and side surface 54 of dovetail groove 52 continue to each other. This configuration enables sealing material 10 to be provided along the inner circumference of dovetail groove 52.

Sealing material 51 in a closed annular shape has a seal inner diameter Ra. Dovetail groove 52 in a closed annular shape has a groove inner diameter Rb. In this case, the elongation percentage $(((Rb-Ra)/Ra)\times 100)$ of sealing material 10 is preferably not less than 0% and not more than 4%.

This configuration enables sealing material 10 to be provided along the inner circumference of dovetail groove 52, while a cross-section deformation of sealing material 10 caused by elongation thereof is suppressed. Accordingly, sealing material 10 is provided with the inner circumference of dovetail groove 52 clamped with an appropriate pressure, and therefore, the ease of installation of sealing material 10 in dovetail groove 52 as well as the stability of sealing material 10 after installed can be improved.

In an example for confirming the functions and effects as described above, the elongation percentage of sealing material 10 installed in dovetail groove 52 shown in FIG. 4 was set to 5%. Then, the clamping force of sealing material 10 was excessively large to thereby cause leading end 32 of lip portion 31 to be warped toward the inner circumference of dovetail groove 52. In contrast, in the case where the elongation percentage of sealing material 10 was set to 4% or less, sealing material 10 could be provided along the inner circumference of dovetail groove 52, while sealing material 10 is kept in an appropriate posture. According to an FEM (Finite Element Method) analysis, regarding the manner of use of the sealing material in FIG. 6 as will be described later herein, the sealing material with an elongation percentage of 0% had a compressive reaction force of 0.082 N/mm. In contrast, the sealing material with an elongation percentage of 5% had a compressive reaction force of 0.087 N/mm which was larger to a certain extent, due to the posture of the sealing material in dovetail groove 52.

Length L1 of main body 21 in the direction in which main body 21 extends linearly is set equal to or less than a bottom surface length L3 of dovetail groove 52 in the same direction (L1≤L3). At this time, length L1 of main body 21 can be set as large as possible to thereby provide excellent handling of sealing material 10 when sealing material 10 is installed in dovetail groove 52 and accordingly improve the workability in installation.

Sealing material 10 has a seal height H from front surface 21a of main body 21, and seal height H is set equal to or larger than a groove height h of dovetail groove 52 (in FIG. 6 as will be described later herein, the groove height is the length from bottom surface 53 of dovetail groove 52 to mating surface 66 of second member 61) (H≥h).

A seal angle β formed by front surface 21a of main body 21 and front surface 31a of lip portion 31 preferably satisfies a relation $0.7\alpha \le \beta \le 1.3\alpha$, where α is a groove angle formed by bottom surface 53 and side surface 54 of dovetail groove 52.

In this configuration, sealing material 10 can be provided along the inner circumference of dovetail groove 52. Accordingly, when sealing material 10 is installed in dovetail groove 52, sealing material 10 can be caught on the inner circumference of the groove, which can improve the workability in installation. Further, the stability of sealing material 10 in dovetail groove 52 can be ensured to thereby prevent twisting of sealing material 10 in dovetail groove 52 or dropping of sealing material 10 from dovetail groove 52. In the present embodiment, seal angle β of sealing material 10 is equal to groove angle α of dovetail groove 52.

Figure 5:
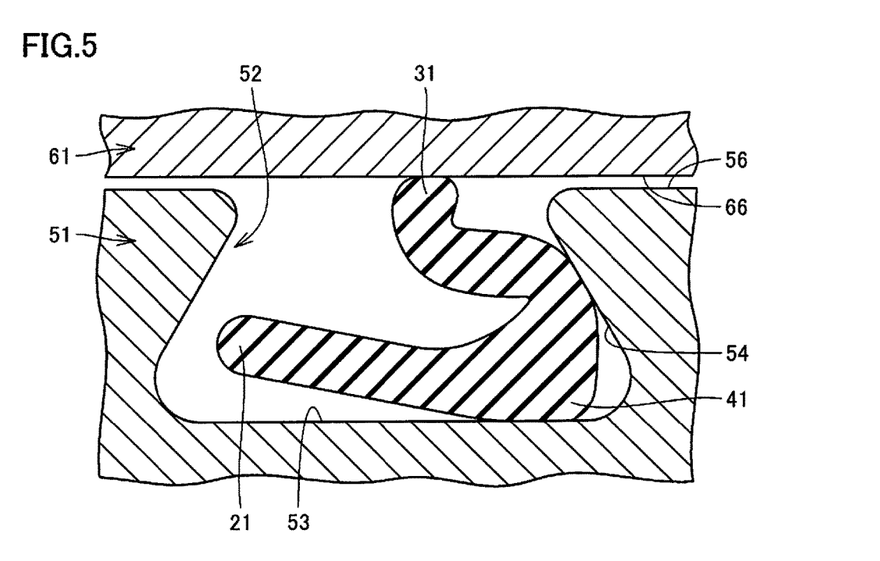
FIG. 5 is a cross-sectional view showing a manner of use of a sealing material when seal angle β=groove angle α+35% is met.

FIG. 5 is a cross-sectional view showing a manner of use of the sealing material when seal angle β=groove angle α+35% is met. In an example for confirming the functions and effects as described above, seal angle β of sealing material 10 installed in dovetail groove 52 shown in FIG. 4 was set to groove angle α+35%. Then, a gap was generated between the sealing material and the inner wall of dovetail groove 52, on the inner circumference of dovetail groove 52. In this case, second member 61 is pressed to contact the sealing material installed in dovetail groove 52. As a result, as shown in FIG. 5, a flex deformation of lip portion 31 was caused. Further, seal angle β was set to groove angle α−40%. At this time, on the inner circumference of dovetail groove 52, the space between bottom surface 53 and side surface 54 of dovetail groove 52 could not be filled with sealing material 10. In contrast, seal angle β was set to fall within groove angle α±30%. Then, sealing material 10 could be provided along the inner circumference of dovetail groove 52.

Figure 6:
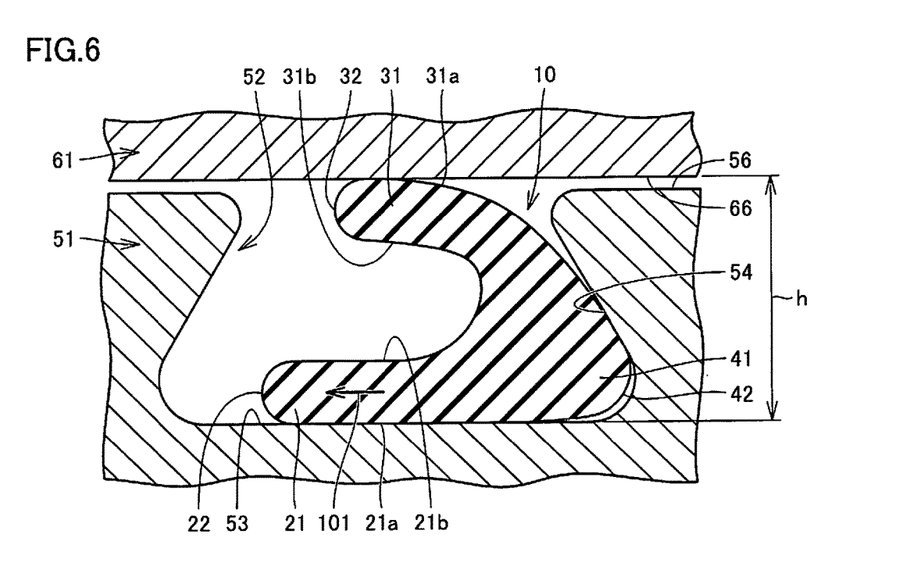
FIG. 6 is a cross-sectional view showing a manner of use of the sealing material in FIG. 2.

FIG. 6 is a cross-sectional view showing a manner of use of the sealing material in FIG. 2. Referring to FIGS. 1 to 4 and 6, sealing material 10 installed in dovetail groove 52 is pressed to contact second member 61 to thereby provide sealing between first member 51 and second member 61. At this time, a slight gap is formed between mating surface 56 of first member 51 and mating surface 66 of second member 61. Lip portion 31 is brought into contact with mating surface 66 of second member 61, and pressed to be elastically deformed toward the inside of dovetail groove 52.

As will be described later herein, in the present embodiment, main body 21 with a small volume is disposed on bottom surface 53 of dovetail groove 52, in order to enable sealing material 10 to be used under an extremely low load. In this case, the ease of installation of sealing material 10 in dovetail groove 52 and the stability of sealing material 10 after installed are sacrificed, and therefore, a configuration for improving them is effectively used.

Figure 7:
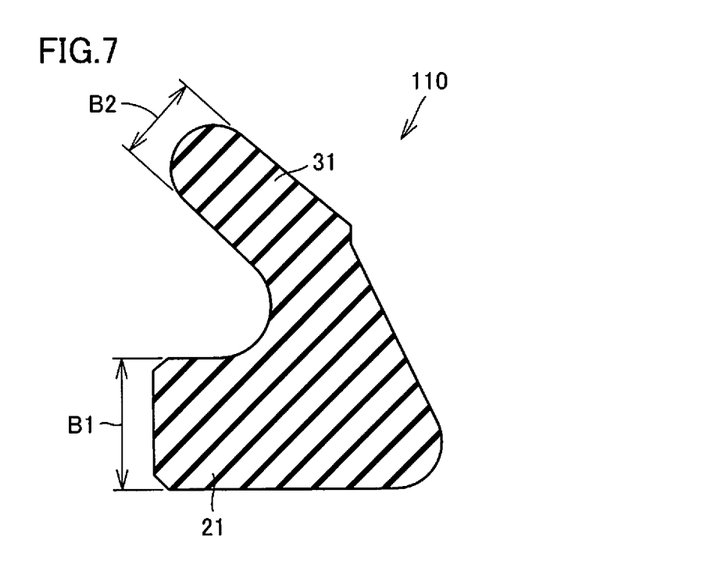
FIG. 7 is a cross-sectional view showing a sealing material given for the sake of comparison.
Figure 8:
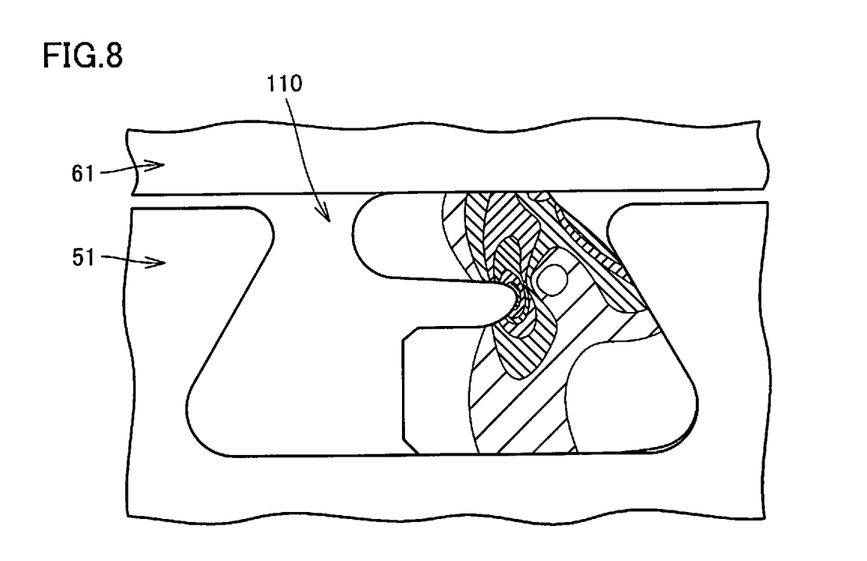
FIG. 8 is a cross-sectional view showing a compressive stress generated in the sealing material given in FIG. 7 for the sake of comparison.

FIG. 7 is a cross-sectional view showing a sealing material given for the sake of comparison. FIG. 8 is a cross-sectional view showing a compressive stress generated in the sealing material given in FIG. 7 for the sake of comparison. In FIG. 8, a region where a compressive stress is generated as determined by an FEM analysis is hatched.

Referring to FIGS. 7 and 8, a sealing material 110 given for comparison has a seal cross-section in a V shape including a main body 21 and a lip portion 31. Regarding sealing material 110, in order to obtain the ease of installation of sealing material 110 in dovetail groove 52 and the stability of sealing material 110 after installed, a width B1 of main body 21 is set larger than a width B2 of lip portion 31.

In sealing material 110 having this configuration, when the amount of deformation of lip portion 31 exceeds a certain value, a compressive stress generated in sealing material 110 starts affecting even main body 21, as shown in FIG. 8. At this time, main body 21 with a high stiffness is not easily deformed, and therefore, the compressive reaction force applied from sealing material 110 to second member 61 sharply increases.

Figure 9:
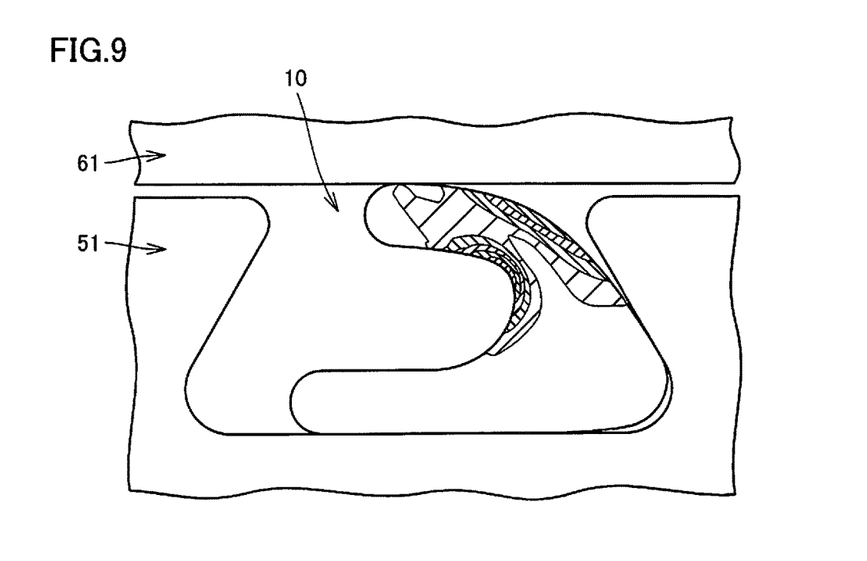
FIG. 9 is a cross-sectional view showing a compressive stress generated in the sealing material in FIG. 2.

FIG. 9 is a cross-sectional view showing a compressive stress generated in the sealing material in FIG. 2. In FIG. 9, a region where a compressive stress is generated as determined by an FEM analysis is hatched.

Referring to FIGS. 6 and 9, in contrast to the above, sealing material 10 in the present embodiment is configured to have width B1 of main body 21 that is set equal to or smaller than width B2 of lip portion 31. Thus, main body 21 is also deformed in the direction indicated by an arrow 101 in FIG. 6. Accordingly, the compressive reaction force applied from sealing material 10 to second member 61 is kept small, and sealing material 10 which can be used under an extremely low load can be implemented.

According to the FEM analysis shown in FIG. 9, the compressive stress from sealing material 10 to second member 61 could be kept 1 N/mm or less.

Regarding sealing material 10 configured in the above-described manner in the first embodiment of the present invention, main body 21 and lip portion 31 are formed to have a common shape so that the overall shape of sealing material 10 is a deformable part, to thereby enable use under an extremely low pressure. There is an additional effect, namely, even in the case where sealing material 10 is installed in dovetail groove 52 with main body 21 and lip portion 31 inverted, excessive degradation of the function of sealing material 10 can be prevented.

There may be an earthquake-resistant structure, namely a structure in which first member 51 and second member 61 are supported by springs from above and from below, and there may be a vacuum structure, namely a structure in which first member 51 and second member 61 are vacuum-drawn from above and from below. In these structures, a force acts in the direction of separating first member 51 and second member 61 away from each other, and therefore, the sealing material is required to be used under an extremely-low-load condition. Further, it is assumed that further reduction in size or weight of the apparatus inevitably reduces the clamping force of first member 51 and second member 61. Sealing material 10 in the present embodiment is used suitably for such an application.

Second Embodiment

A sealing material in the present embodiment has the same shape as sealing material 10 in the first embodiment. In the following, the description of any structure identical to the corresponding structure of sealing material 10 in the first embodiment will not be repeated.

Referring to FIGS. 1 to 4 and 6, the sealing material in the present embodiment is a sealing material configured to be installed in dovetail groove 52 and having a closed annular shape. Sealing material 10 has a seal cross-section including main body 21 arranged on bottom surface 53 of dovetail groove 52, and lip portion 31 bent from an end of main body 21 and extending toward an outside of dovetail groove 52. The seal cross-section has a cross-section characteristic that a stiffness of main body 21 is not more than a stiffness of lip portion 31.

In the present embodiment, the stiffness of main body 21 is equal to the stiffness of lip portion 31.

This characteristic, namely the stiffness of main body 21 is set equal to or less than the stiffness of lip portion 31, causes main body 21 to be deformed as well in the direction indicated by arrow 101 in FIG. 6. Accordingly, a compressive reaction force applied from sealing material 10 to second member 61 is kept small, and sealing material 10 which can be used under an extremely low load can be implemented.

A description will be given of how to determine whether the seal cross-section of the sealing material has a cross-section characteristic that the stiffness of main body 21 is equal to or less than the stiffness of lip portion 31. First, a seal cross-section (the cross-sectional shape shown in FIG. 2) of the sealing material is input to a computer. Lip portion 31 is placed on a horizontal plane, a load is applied to main body 21 in the direction orthogonal to the horizontal plane. Under a condition that the sealing material is compression-deformed by 1 mm, a compressive stress generated in main body 21 and a compressive stress generated in lip portion 31 are determined by way of an FEM analysis. As a result of the analysis, when a relation: compressive stress (reaction force) generated in main body 21 compressive stress (reaction force) generated in lip portion 31 is met, the seal cross-section of the sealing material has the cross-section characteristic that the stiffness of main body 21 is equal to or less than the stiffness of lip portion 31.

The sealing material configured in the above-described manner in the second embodiment of the present invention can similarly produce the effects described above in connection with the first embodiment.

Third Embodiment

In the present embodiment, various modifications of sealing material 10 described above in connection with the first and second embodiments will be described.

Figure 10:
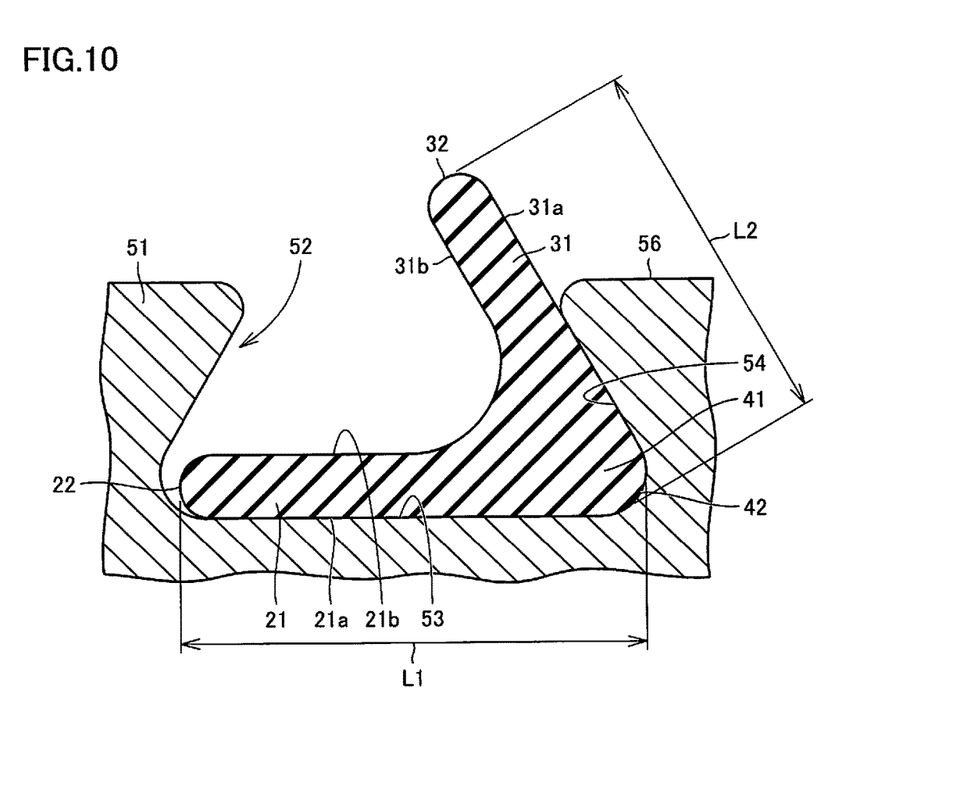
FIG. 10 is a cross-sectional view showing a first modification of the sealing material in FIG. 2.

FIG. 10 is a cross-sectional view showing a first modification of the sealing material in FIG. 2. Referring to FIG. 10, in this modification, length L1 of main body 21 in the direction in which main body 21 extends linearly is larger than length L2 of lip portion 31 in the direction in which lip portion 31 extends linearly (L1>L2). In this configuration, handling of the sealing material when the sealing material is installed in dovetail groove 52 is improved, and the workability in installation can be enhanced.

Figure 11:
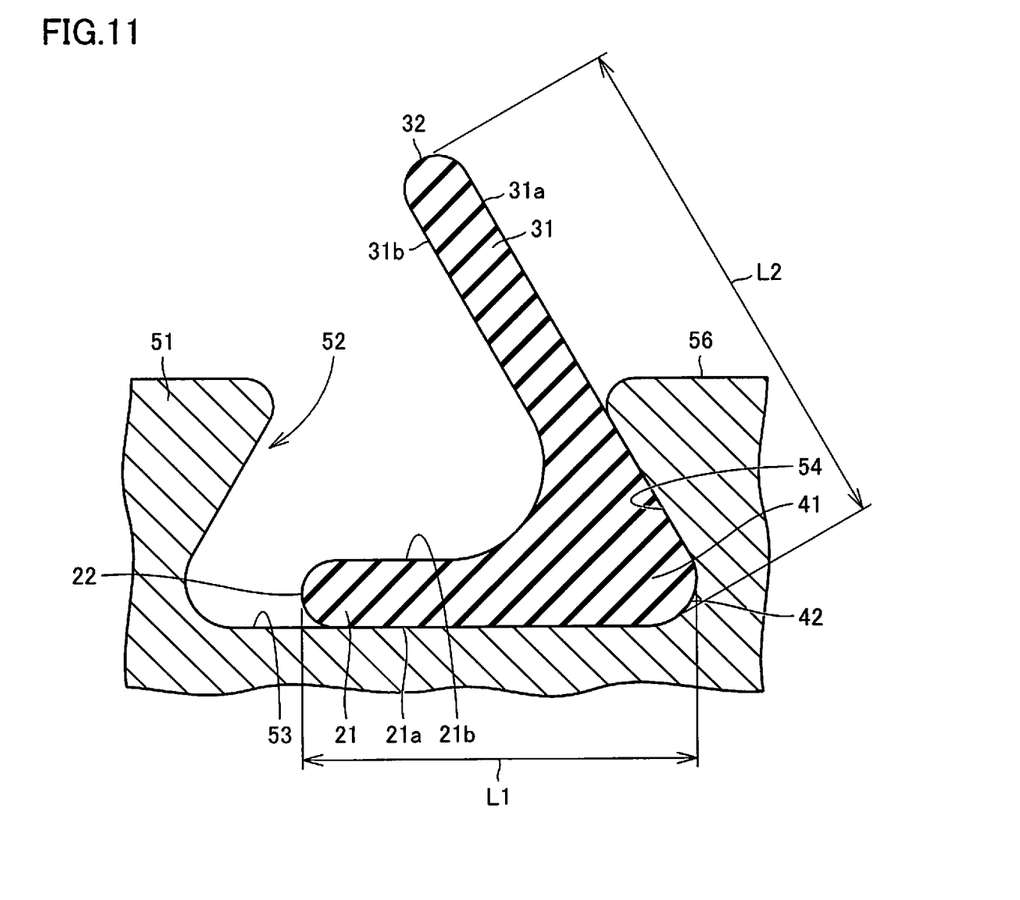
FIG. 11 is a cross-sectional view showing a second modification of the sealing material in FIG. 2.

FIG. 11 is a cross-sectional view showing a second modification of the sealing material in FIG. 2. Referring to FIG. 11, in this modification, length L1 of main body 21 in the direction in which main body 21 extends linearly is smaller than length L2 of lip portion 31 in the direction in which lip portion 31 extends linearly (L1<L2). In this configuration, a closed space can be formed at an earlier timing in the case of use in which second member 61 is moved to first member 51 so as to repeatedly form a closed space.

Figure 12:
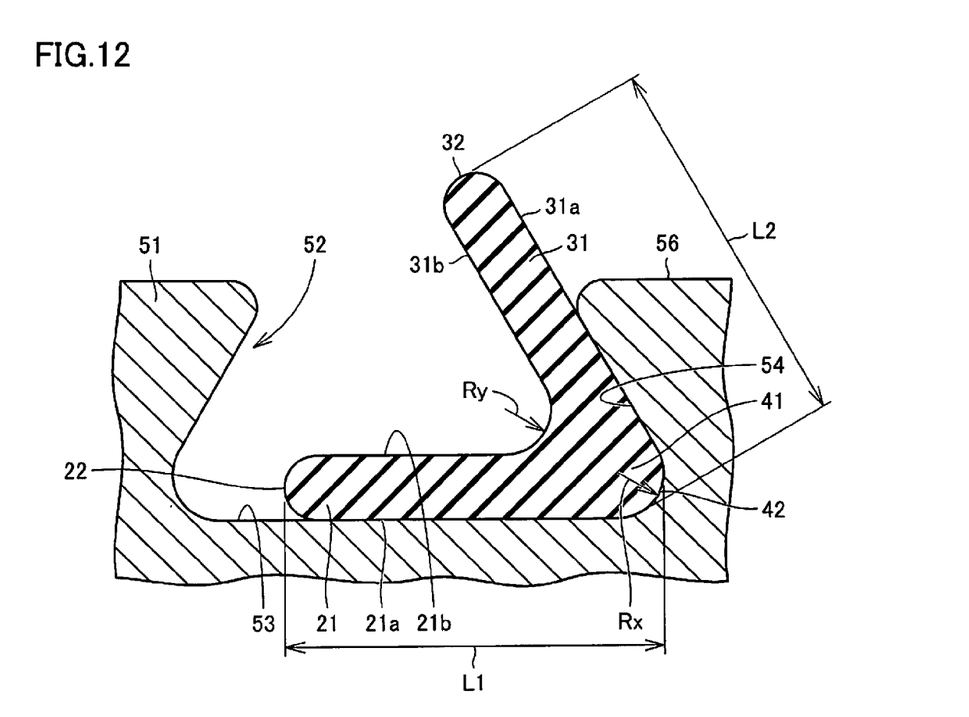
FIG. 12 is a cross-sectional view showing a third modification of the sealing material in FIG. 2.

FIG. 12 is a cross-sectional view showing a third modification of the sealing material in FIG. 2. Referring to FIG. 12, in this modification, radius of curvature Rx at a position where front surface 21*a* and front surface 31*a* continue to each other is equal to radius of curvature Ry at a position where back surface 21*b* and back surface 31*b* continue to each other.

The sealing material configured in the above-described manner in the third embodiment of the present invention can similarly provide the effects described in connection with the first embodiment.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

INDUSTRIAL APPLICABILITY

The present invention is mainly applied to a sealing material configured to be installed in a dovetail groove.

REFERENCE SIGNS LIST

10 sealing material; 21 main body; 21*a*, 31*a* front surface; 21*b*, 31*b* back surface; 22, 32, 42 leading end; 31 lip portion; 41 bending position; 51 first member; 52 dovetail groove; 53 bottom surface; 54 side surface; 56, 66 mating surface; 61 second member

The invention claimed is:

1. A sealing material configured to be installed in a dovetail groove and having a closed annular shape,
the sealing material having a seal cross-section comprising
a main body arranged on a bottom surface of the dovetail groove, and
a lip portion bent from an end of the main body and extending toward an outside of the dovetail groove,
the seal cross-section having such a V shape that each of the main body and the lip portion extends linearly from a bending position between the main body and the lip portion,
said main body having a first front surface which abuts a bottom surface of the dovetail groove, and a first back surface located on a back side with respect to said first front surface and extends parallel to said first front surface,
said lip portion having a second front surface which abuts a side surface of the dovetail groove, and a second back surface located on a back side with respect to said second front surface and extends parallel to said second front surface, and
a width of the main body in a direction orthogonal to a direction in which the main body extends linearly between said first front surface and said first back surface being not more than a width of the lip portion in a direction orthogonal to a direction in which the lip portion extends linearly between said second front surface and said second back surface.

2. The sealing material according to claim 1, wherein the width of the main body is equal to the width of the lip portion.

3. The sealing material according to claim 1, wherein a length of the main body in the direction in which the main body extends linearly is equal to a length of the lip portion in the direction in which the lip portion extends linearly.

4. The sealing material according to claim 1, wherein a length of the main body in the direction in which the main body extends linearly is larger than a length of the lip portion in the direction in which the lip portion extends linearly.

5. The sealing material according to claim 1, wherein a length of the main body in the direction in which the main body extends linearly is smaller than a length of the lip portion in the direction in which the lip portion extends linearly.

6. The sealing material according to claim 1, wherein the sealing material in the closed annular shape has an elongation percentage (((Rb−Ra)/Ra)·100) of not less than 0% and not more than 4%, where Ra is an inner diameter of the sealing material in the closed annular shape and Rb is an inner diameter of the dovetail groove in a closed annular shape.

7. The sealing material according to claim 1, wherein
a seal angle b formed by the first front surface and the second front surface satisfies a relation $0.7a \leq b \leq 1.3a$, where a is a groove angle formed by the bottom surface and the side surface of the dovetail groove.

* * * * *